United States Patent [19]

Wallace

[11] 4,256,569
[45] Mar. 17, 1981

[54] ARRANGEMENT TO IMPROVE THE OPTIMIZATION OF THE VALUE OF FINISHED CUTS IN A LIVESTOCK PROCESSING PLANT

[75] Inventor: Charles H. Wallace, Carrollton, Va.

[73] Assignee: International Telephone and Telegraph Corporation, New York, N.Y.

[21] Appl. No.: 42,733

[22] Filed: May 29, 1979

[51] Int. Cl.³ .................. B07C 9/00; G01G 19/40
[52] U.S. Cl. .................. 209/3.3; 209/558; 209/942; 73/432 R; 414/134
[58] Field of Search .................. 209/3.1, 3.3, 509, 521, 209/552, 555, 558, 942; 73/432 R; 414/134; 17/45, 52, 54

[56] References Cited

U.S. PATENT DOCUMENTS

| | | | |
|---|---|---|---|
| 3,027,594 | 4/1962 | Moss | 17/45 |
| 3,645,394 | 2/1972 | Goodale | 209/555 X |
| 3,735,247 | 5/1973 | Harker | 324/227 X |
| 3,759,384 | 9/1973 | Holmberg et al. | 209/942 |
| 3,940,998 | 3/1976 | Sourby et al. | 73/432 R |
| 4,195,346 | 3/1980 | Schröder | 209/942 |

Primary Examiner—Joseph J. Rolla
Attorney, Agent, or Firm—John T. O'Halloran; Alfred C. Hill

[57] ABSTRACT

An arrangement of this invention comprises a device to apply a different identification mark to each of a plurality of heads of livestock and to couple each of the identification marks to an optimization computer, each of the identification marks remaining with its associated one of the plurality of heads of livestock until the finished cuts are obtained; a scale to separately weigh each of the heads of livestock in sequence and to couple each of the resultant weights to the computer with each of the weights being correlated with the associated one of the identification marks; an automatic electronic grader to separately and automatically grade each of the heads of livestock in sequence and to couple each of the resultant grades to the computer with each of the grades being correlated with the associated one of the identification marks and the associated one of the weights; and a plurality of gate controlled sorting pens to sort the plurality of heads of livestock according to the weights and grades after passing through the scale and grader.

28 Claims, 9 Drawing Figures

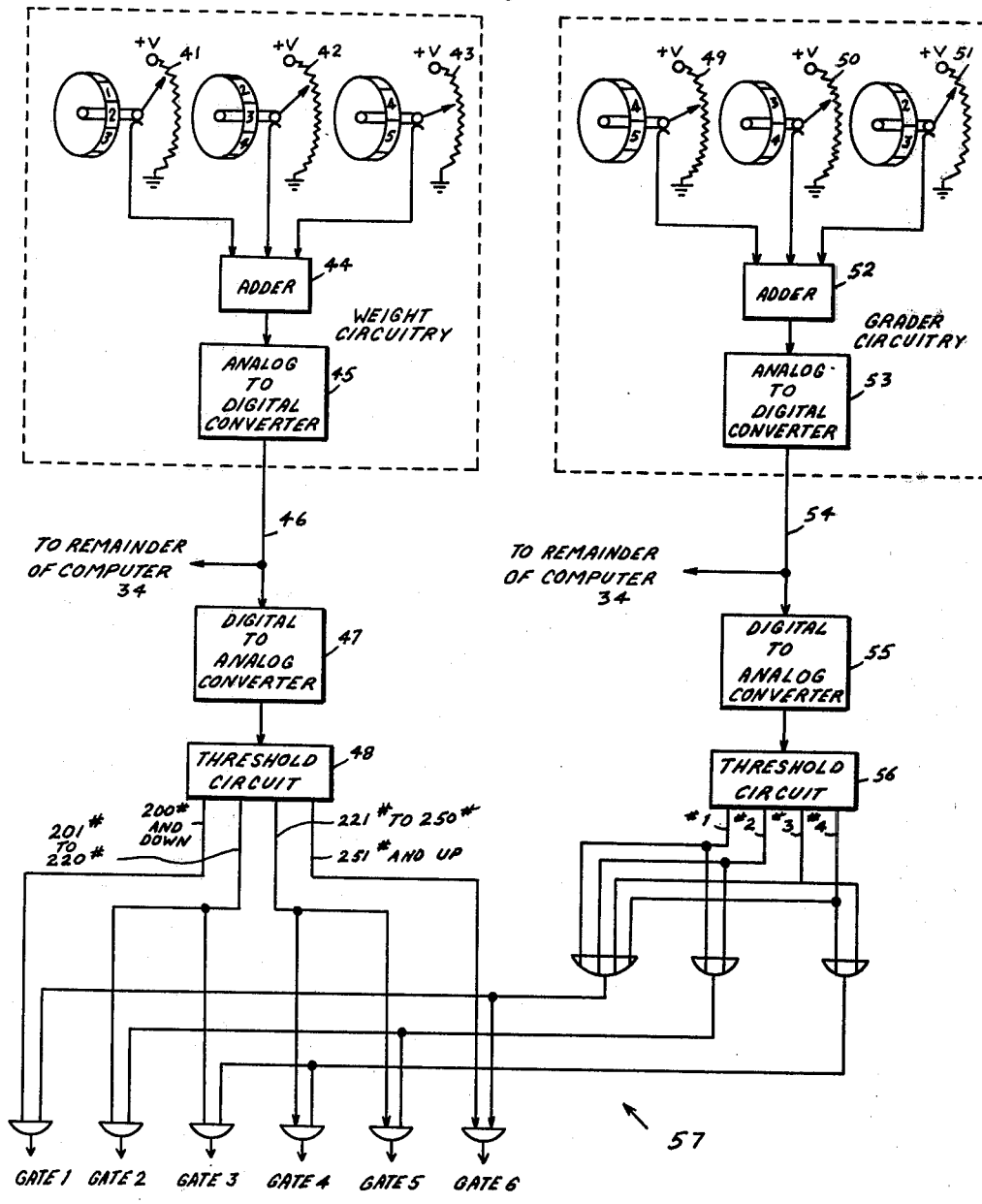

ARRANGEMENT TO IMPROVE THE OPTIMIZATION OF THE VALUE OF FINISHED CUTS IN A LIVESTOCK PROCESSING PLANT

BACKGROUND OF THE INVENTION

This invention relates to an arrangement for use in meat livestock processing plants and more particularly to an arrangement for use in such a plant for improving the optimization of the value of the finished cuts obtained by the method described in copending application of Charles H. Wallace and Richard W. Moncure, Ser. No. 857,324, filed Dec. 5, 1977, now abandoned.

The above-cited copending application is an improvement over the processing method disclosed in U.S. Pat. No. 3,940,998 issued to John C. Sourby and Charles H. Wallace on Mar. 2, 1976. The above-cited copending application and patent and the present invention disclose the evolution of a development project being carried on by ITT Gwaltney, Inc. of Smithfield, Virginia to optimize the value of the resulting cuts made from each carcass of a plurality of heads of livestock under existing market conditions as well as to provide management with a tool by which each head of livestock can be evaluated in terms of profit or loss based on the total operation of the processing plant from purchase of the heads of livestock to sale of the resultant finished products. It should be noted that the process described in the cited copending application, U.S. patent and the present invention are described with reference to a hog processing plant, but is not limited thereto since the techniques described can be employed with other livestock from which meat products are obtained.

The process described in the above-cited patent includes making physical measurements of the ham circumference, body length and fat depth and a subjective evaluation of muscle quality in the cutting department immediately after being removed from the cooling department. These measurements and evaluation provide data to a computer which, in accordance with the algorithm set forth therein, predicts the weight or range of weights of the ham/loin cuts which can be produced and issues instructions as to the point with respect to the aitch bone for the butcher to cut each individual hog carcass to optimize the value under existing market price conditions of the resulting ham/loin cut from each individual hog carcass without regard to the other carcasses to be processed in a given period of time, such as a day. In practice, it has been proven that the subject matter of the above-cited patent resulted in considerable improvement in the profitability of hog processing plants. The value of the hog cuts obtained by the process of the above-cited patent is calculated daily utilizing current market values for each cut. The market value of each cut in turn is based on the cut weight and all cuts within a given weight range have the same market value. Accordingly, the desired weight of each of the primal cuts and each of the various trims whether boneless or bone-in are determined to produce the maximum return based on current market conditions by establishing the exact points of demarcation between each primal cut. To a considerable extent each day's slaughter which will be cut the following day or within a day or so must satisfy existing market demand. Thus, the demand on any given day that the cut-up product is sold will vary and in fact may even vary during the day's cutting operation, depending upon sales conditions.

The improvement as taught in the above-cited copending application provides a process in which each individual carcass is identified immediately following the killing of the animal and after it has been dehaired, singed and polished. The physical data (the above-mentioned measurements and evaluation) of the carcass, after it is identified with a discrete indicia, is obtained in the killing department rather than in the cutting department. This process is different than that disclosed in the above-cited patent wherein the determination of the line of demarcation between the various cuts was determined just before the actual cutting of each carcass individually and did not require an identifying indicia and which did not take into consideration the other carcasses to be processed in a given period of time. By taking the physical data of the carcasses in the killing department rather than in the cutting department, a truer weight of the purchased animal was obtained which enabled a more accurate payment to the supplier of the livestock and which enabled obtaining a more accurate indication of the shrinkage that takes place in the cooling department, and as a result a more accurate profit and loss determination was capable with the process as described in the above-cited copending application. In addition, the use of the identification mark or indicia for each carcass as described in the above-cited copending application enables the butcher to retrieve the cutting instructions from the computer for each carcass he is about to butcher by use of the identification indicia. This is important since due to intentional or unintentional reasons, the hog carcasses may arrive at the butcher out of sequence and without the identification marking it would be impossible for the butcher to retrieve the proper cutting instructions from the computer for the particular carcass about to be butchered.

The marketing of hogs for slaughter is done by a variety of procedures. Pork packers buy direct from producers on a delivered basis with hogs sorted by the packer for weight and grade, and weighed in drafts of several hogs per scale. Hogs weighing from 200 to 240 lbs. (pounds) are considered top-weight range. Hogs rated No. 1 for quality and weighing 200 to 240 lbs. command the top of the market with a discount for grade 2, grade 3 and grade 4 from grade 1 hogs.

In a typical market day the price of hogs will vary. The market discounts and premiums remain quite constant even though the basic top of the market may be $20 per cwt. (hundred weight) and over a long span of time, the price of top hogs may increase to $50 per cwt. and the discounts from No. 1 hogs to No. 2 hogs remain the same. According to pricing practices, hogs are discounted for weights below 200 lbs. and also discounted for weights in excess of 240 lbs. These weight discounts remain very constant even though the top price may vary from $20 to $50 within a period of two years. Also, with respect to different prices, the hogs below 200 lbs. are sorted in 10 lb. ranges as follows:

191/200
181/190
171/180
161/170
151/160
141/150

Also, hogs above 240 lbs. are also sorted in 10 lbs. weight ranges as follows:

241/250

251/260
261/270
271/280
281/290
291/300

In prior practices it is customary when unloading hogs from a truck to drive 200 to 240 lb. hogs into a livestock or draft scale with about a 40 hog capacity and to sort all others into a sorting pen. This sort is by the subjective judgement of a skilled hog buyer.

After weighing all 200-240 lb. hogs by each grade classification, the lightest hogs are selected from the sorting pen in 10 lb. weight ranges and according to grade and then weighed. The grading is based on the subjective judgement of a skilled hog grader. Then those hogs which are heavier than 240 lbs. are selected in 10 lb. weight ranges and by grade, repeating until all hogs have been sorted by weight and grade through the subjective judgement of a skilled hog buyer and/or grader.

Different buying arrangements are entered into with different producers. Usually, they either deliver with a contract trucker or with their own truck. In some cases, the packer reimburses the cost of the freight to the producer, with the producer being responsible for the condition of the animals until they are accepted by the packer. The packer pays for weight delivered and the packer grades and sorts. Another type of transaction is the purchase through an order buyer who operates in a terminal market.

The buyer for the pork packer will place an order by telephone to an order buyer in a distant market indicating the kind of a load he desires by weight range and grade. Assume he has given an order for 200 to 240 lbs., all No. 1 and/or No. 2 grades. The buyer will accept such an order conditionally, usually stating he will do his best but may be forced to fill out the load with either some heavier weight or some lighter, in which case the packer buyer may express his preference for hogs under 200 lbs. rather than those over 240 lbs. (because he may have too many heavy weights from his direct sources).

The order buyer will purchase loads of hogs at a terminal market and redistribute the loads to meet his clients wishes. The order buyer will have the terminal market weigh the groups of hogs as they are assigned to fulfill a given packers order. The order buyer's received weight then becomes the invoice weight for the outbound load. It is possible that some of the hogs in the load will be weighed at 7:00 a.m. and the last hogs weighed at 2:00 p.m. the same day, with the packer buyer absorbing any weight loss from the time of purchase by the order buyer. This is called buying shrink. The order buyer will arrange for the livestock trucking, with the packer paying freight and absorbing the in-transit shrink as well as the buying shrink.

Another type of transaction will be made with the dealer who operates a small livestock market with concentration point. Small producers in a radius of this point will find it a convenient point to market their hogs. The packer buyers will place an order with this dealer. Being usually very astute, the dealer becomes quite familiar with the exact needs of his respective customers and is well acquainted with his producers. He buys and sorts to his customers' needs and generally invoices the packers for the weights he paid for as he identifies hogs for his customers at time of purchase. He will sort by weight and grade. He also has more freedom in his trading than an order buyer who operates out of a large terminal market.

There are many variations of these sources, but the above covers the concept. It is to be noted that it is legal for a country market to add back buying shrink when billing out a load. He is not under constant government supervision as exists at a terminal market.

When a packer receives his hog purchases and weighs and sorts at the time of delivery, he has bought shrinkage from all sources except from the producer who delivered hogs direct to the packer and sold at delivered weight, with the packer sorting and grading to establish value.

Many factors enter into the shrinkage of each load, for instance, ambient temperatures, how long it has been since the animal was fed and watered, how many miles the animal have travelled since time in a livestock truck can and does cause stress especially with hogs raised in confinement. Some of the shrinkage is fecal and some is tissue with it being very difficult to determine how much of each to apply to each shipment.

Shrinkage is very carefully established on each load purchased. On some loads it will amount to 5%, others 7%, depending upon distance travelled. Weighing hogs in groups of 15 to 40 heads per draft scale makes it difficult to establish whether the large hog shrinks a greater percentage than the small hog. It is known that a great deal of this shrinkage is tissue, since dressing yields on a load of hogs with excessive in-transit shrinkage will be reflected in low dressing yields when calculated from purchase weights. The cost of the buying and in-transit shrinkage or weight loss is easily calculated, however, the effect on price paid by weight and grade is more complex.

Hogs are not currently weighed individually. The time required to separate one hog from another, drive it onto the scale, confine it, and then weigh it and then repeat this procedure 600 times per hour has made individual hog weighing impractical in the past and considered impossible when using the procedures developed for weighing 20-40 hogs per draft scale.

As disclosed in the above copending application, a scale is employed to electronically record the weight of individual hogs after slaughter, before opening, with only blood and hair removed. It has been possible to audit purchase loads by mathematically restoring blood and hair on each hog and then trace these hogs back to the weight received as a direct purchase from the producer and arrive at that live weight quite accurately since blood and hair is 5% of the live hog weight, with only minor variations from this number. It has been found that the hog buyer-grader cannot accurately estimate individual hogs for weight and sort them into 10 lb. weight ranges. In total, the average of the averages would indicate a proper sort. However, hogs sorted to be 181 to 190 lbs. inclusive will have some hogs weighing 178 lbs. and others weighing 193 lbs. This applies to all weight ranges. It is doubted that any buyer-grader can estimate the weight of hogs closer than 2 to 3 lbs. on an individual basis. Generally, they will do a better job of sorting No. 1, No. 2 and No. 3 quality grades. Even here it has been learned that subjective evaluation at 600 hogs per hour will result in errors on borderline cases.

The pre-eviscerated scale information is an excellent audit tool and has worked well enough to indicate the need to buy the live hog on an individual weight-and-grade basis.

SUMMARY OF THE INVENTION

An object of the present invention is to provide an arrangement to improve the value of finished cuts obtained from each of a plurality of heads of livestock in a livestock processing plant.

Another object of the present invention is to provide an arrangement wherein the optimization of the value of finished cuts obtained from each of a plurality of heads of livestock is improved with respect to the optimization obtained with the technique disclosed in the above-cited copending application.

Still another object of the present invention is to provide an arrangement to individually weigh and grade a head of livestock automatically and without employing the subjective judgement of a hog-buyer-grader.

A further object of the present invention is to provide an arrangement which automatically weighs and grades individually 600 hogs per hour with reduced manpower and with a scientific automatic evaluation of grade rather than the subjective judgement of a hog grader.

Still a further object of the present invention is to provide an arrangement which automatically weighs and grades hogs individually and which either manually or automatically sorts the weighed and graded hogs according to their weight and grade to enable a more efficient utilization of the coolers in the chilling department and thereby provide the desired chilled temperature for the carcasses of all heads of livestock being processed.

A feature of the present invention is the provision of an arrangement to improve the optimization of the value of finished cuts obtained from each of a plurality of heads of livestock in a livestock processing plant comprising: first means to apply a different identification mark to each of the plurality of heads of livestock and to couple each of the marks to an optimization computer, each of the marks remaining with its associated one of the plurality of heads of livestock until the finished cuts are obtained; second means disposed adjacent the first means to separately weigh each of the heads of livestock in sequence and to couple each of the resultant weights to the computer, each of the weights being correlated with an associated one of the marks; and third means disposed adjacent the second means to separately and automatically grade each of the heads of livestock in sequence and to couple each of the resultant grades to the computer, each of the grades being correlated with an associated one of the marks and an associated one of the weights.

Another feature of the present invention is the provision of a fourth means disposed adjacent the above-mentioned third means to sort the plurality of heads of livestock according to the weight and grade of each of the plurality of heads of livestock.

Utilizing the individual weight-and-grade techniques of the present invention, a pork packer would buy all direct purchase hogs accurately and can eliminate the audit procedure on these hogs to account for buying and transit shrinkage. Hogs purchased through a dealer or order buyer will be audited using the live hog individual weight and grade technique of the present invention. The weight sort would be adjusted to reflect buying and transit shrinkage for the entire load using the sum of individual hog weights received in a load compared to invoiced weights. The individual hog received weights will then be increased by this percentage factor to arrive at the weight of each hog at the time of purchase. This weight-and-grade evaluation will take place immediately upon receipt of these shipments. The comparison between different sources will be a valuable tool to a hog buyer to determine the best and least cost source. At least some of the shrinkage in buying and transporting can be compensated for by changing the request for composition of the load in accordance to the shrink information generated through analysis of the data. Hogs in heavier weight classes, at discounted prices can be purchased and allowed to shrink down to the desired weight range. This would result in lower per-pound costs.

The weighing of individual hogs as received and the electronic grading for quality at the same time will reduce the cost to do both functions, making information available promptly as hogs are unloaded.

Each individual hog will be sequentially tattooed at the time of or just prior to the automatic weighing and electronic grading. A printout of the individual hog weight and grade for each hog in a load will be generated with a copy for the producer or order buyer by the computer.

A computer program will sort these into number of hogs and weight by weight range and by grade. Quoted prices will be used to price each category. Invoices will be produced and checks written by the computer to complete transactions. The grade and weight of each hog will be stored on a storage medium with its tattoo or identification number.

When the hog is slaughtered, additional data will be collected as disclosed in the above-cited copending application. The information obtained on individual weight and grade for each live hog will improve the integrity and optimization of the method described in the above-cited copending application.

BRIEF DESCRIPTION OF THE DRAWING

Above-mentioned and other features and objects of this invention will become more apparent by reference to the following description taken in conjunction with the accompanying drawing, in which:

FIG. 9 is a schematic block diagram of one possible embodiment enabling the automatic control of the gates of the gate controlled sorting pens of FIG. 2.

DESCRIPTION OF THE PREFERRED EMBODIMENTS

Figure 1:
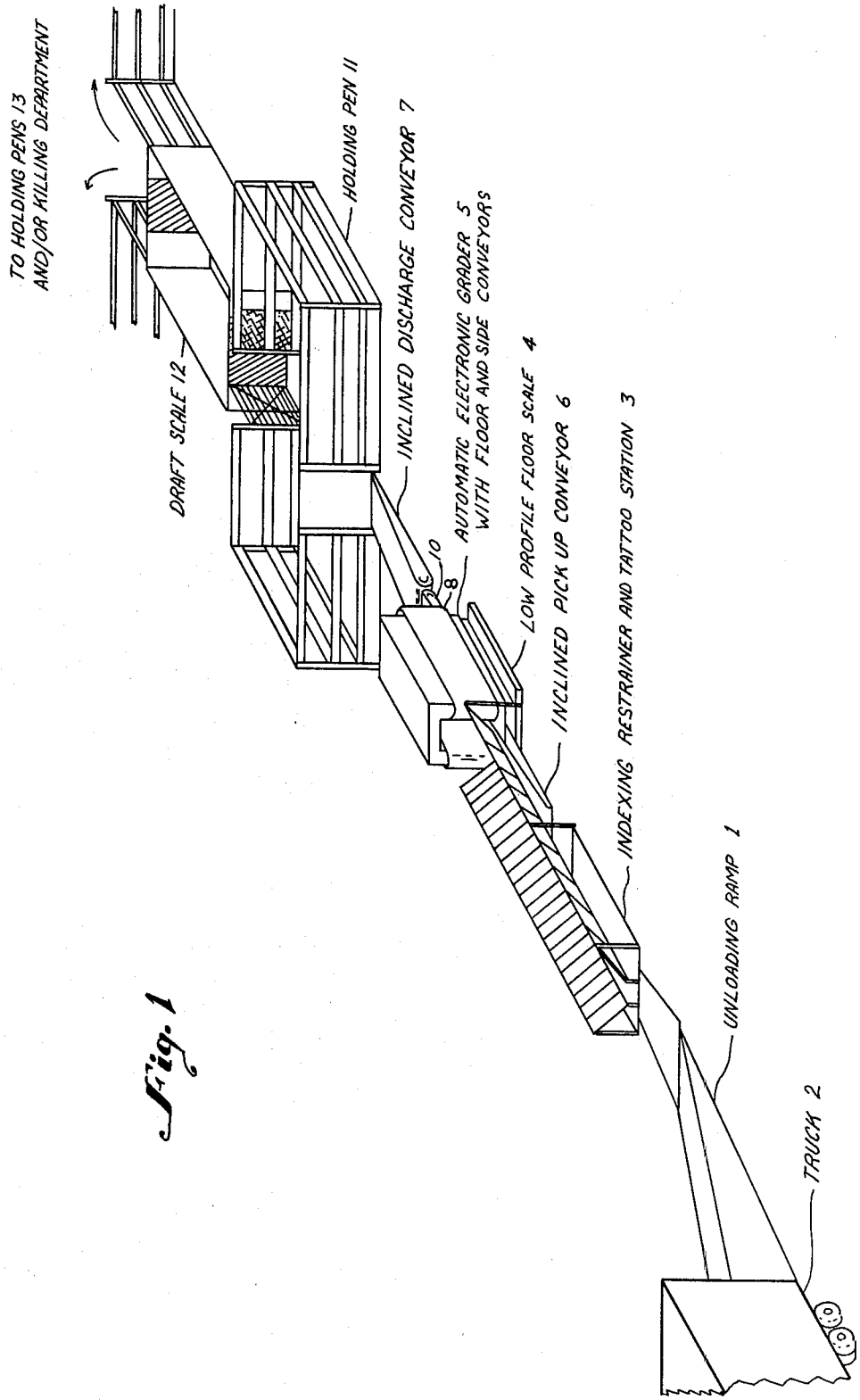
FIG. 1 is a schematic illustration of one embodiment of an arrangement in accordance with the principles of the present invention.

Referring to FIG. 1, one embodiment of the arrangement for the present invention is illustrated as comprising an unloading ramp 1 to enable the heads of livestock to be moved from truck 2 to an indexing restrainer and tattoo station 3. The purpose of the indexing restrainer at station 3 is to index each head of livestock on an individual basis into the combination of the low profile floor scale 4 and the automatic electronic grader 5. At station 3 each of the heads of livestock have different tattoos or other identification marks applied thereto by a tattoo device which penetrates the hide and hair with ink being dispensed to provide the identification mark or tattoo in the meat under the hide which will be removed with the hair in the killing department. Such a tattoo device is disclosed in copending application Ser. No. 137,941, filed Apr. 7, 1980. Preferably the combination of scale 4 and grader 5 is disposed above ground to avoid the requirement of digging a pit to put scale 4 in, which pit creates a clean-up problem. To enable the above-ground installation of scale 4 and grader 5, there is provided an inclined pick-up conveyor 6 and an inclined discharge conveyor 7. Conveyors 6 and 7 together with floor and side conveyors in grader 5 may be eliminated and ramps provided in place of conveyors 6 and 7 so that the heads of livestock will individually walk into and out of the combination of scale 4 and grader 5. It has been found that the impact of a hog setting a foot down due to walking on the floor belt-type conveyor 10 introduced half-pound error in the weight of the hog. It has been determined that this half-pound error is acceptable in most situations and, of course, this weighing in motion (walking) results in simpler construction of scale 4 and grader 5 than when employing conveyors. However, to obtain a more accurate measurement of the weight of the individual hogs, side conveyors 8 and 9 are provided in addition to floor conveyor 10 to restrain the hog from walking on floor conveyor 10. Due to the arrangement of side restraining conveyors 8 and 9, the hog cannot walk since all four feet are suspended in mid air. To obtain the static weight of the hog being measured, side conveyors 8 and 9 and floor conveyor 10 are stopped for approximately two seconds to enable obtaining the static weight of the hog. After having passed through the combined scale 4 and grader 5, the hogs are removed therefrom by conveyor 7 and passed to a holding pen 11 from which 15 to 40 hogs are permitted to enter the draft scale 12 which provides a check on the weight obtained from the individual weights of the total load on a government sealed scale. From scales 12 the hogs are permitted to enter holding pens 13 from which they are herded into the killing department, or the hogs are herded directly into the killing department, depending upon the demand in the killing department.

The indexing restrainer in station 3 may be a No. 1005 Boss Hog Restraining Unit manufactured by the Cincinnati Butcher's Supply Company of Cincinnati, Ohio. Scale 4 may be any one of a number of Fairbanks low profile floor scales, such as Model H-22-6115, obtainable from the Fairbanks Weighing Division of Colt Industries of St. Johnsbury, Vt. depending upon the application. The automatic electronic grader 5 may be Model EMME SA-1 supplied by the EMME Co. of Phoenix, Ariz., whose operation is fully disclosed in U.S. Pat. No. 3,735,247.

Figure 2:
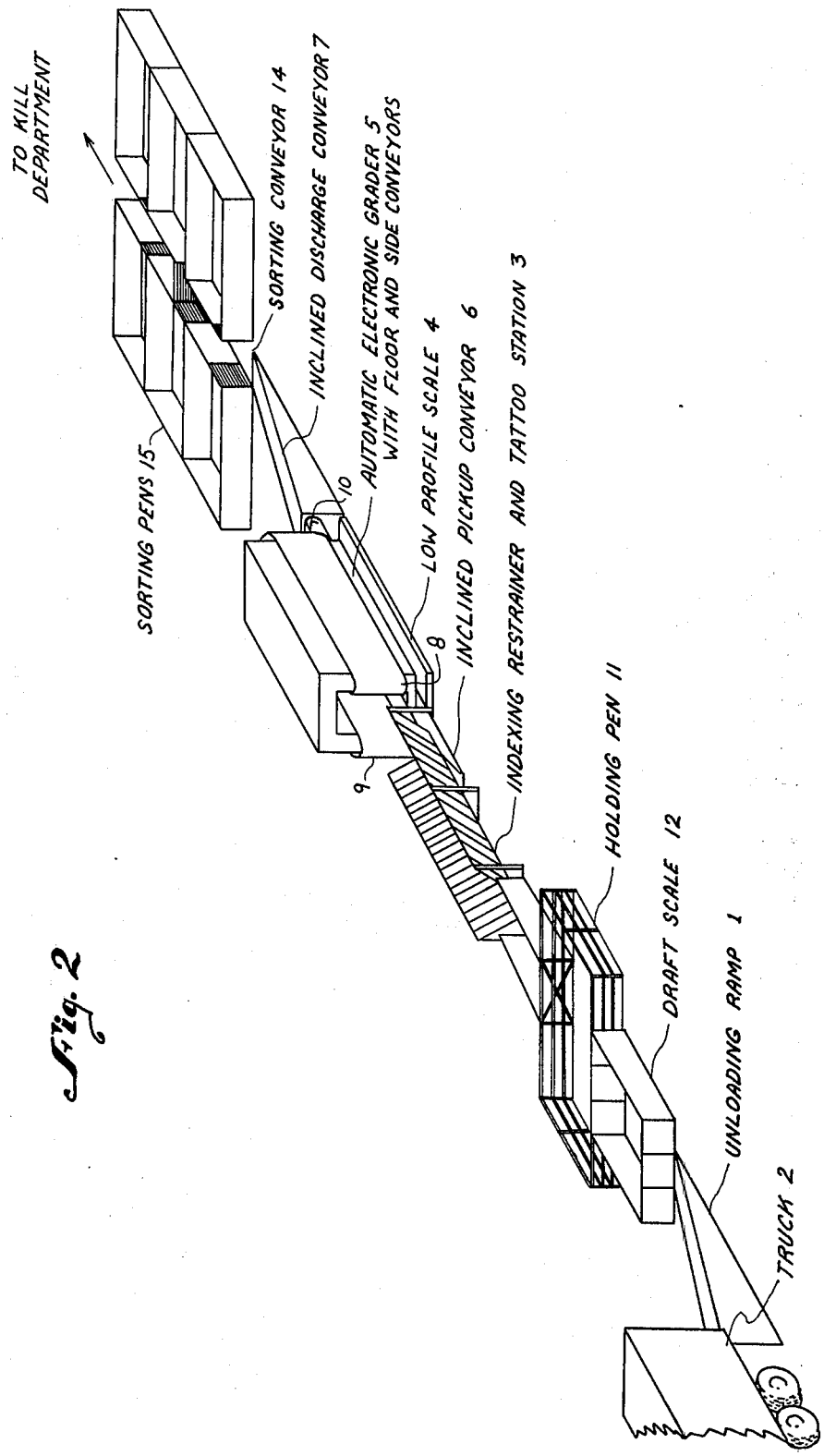
FIG. 2 is a schematic illustration of another embodiment of the arrangement in accordance with the principles of the present invention.

Referring to FIG. 2, there is illustrated therein a second embodiment of the arrangement of the present invention including substantially the same equipment as in the embodiment of FIG. 1, but reorganized to enable a sorting of the hogs according to weight and grade after being individually weighed and graded. The same reference characters will be employed in describing the equipment of FIG. 2 which are identical to the equipment of FIG. 1. The hogs are unloaded from truck 2 by ramp 1 leading directly to draft scales 12 in which 15 to 40 hogs are weighed simultaneously with a number of such draft weights providing a check on the weight of the total load delivered. From scale 12 the hogs are led into holding pen 11 from which individual ones of the hogs are indexed into the combination of scale 4 and grader 5 by means of the indexing restrainer present at station 3. At station 3 each of the hogs are identified by a different tattoo or identification mark. Pick-up conveyor 6 picks up the individual hogs in sequence and places each of the hogs in the center of floor conveyor 10. Each of the hogs are restrained from walking on floor conveyor 10 by side conveyors 8 and 9 as described hereinabove with respect to FIG. 1 to obtain a more accurate weight for the hog. However, as described with respect to FIG. 1, it is possible to obtain the moving weight of the individual hogs with less accuracy but with simpler equipment due to the elimination of side restraining conveyors 8 and 9 and pick-up and discharge conveyors 6 and 7 which would be replaced by a pick-up and discharge ramp upon which the individual hogs would walk.

The individual hogs would be discharged by discharge conveyor 7 onto a sorting conveyor 14 arranged in a passageway along which are disposed a plurality of gate controlled sorting pens 15. The gates of pens 15 project approximately 45° into the passageway provided with conveyor 14 when the gates are opened to direct the hog associated with the opened gate into the associated one of pens 15. Each of the sorting pens 15 would be assigned a particular weight range and grade and the gate associated with these pens would be controlled manually by an operator or automatically by electronic circuitry to open the appropriate ones of the gates dependent upon the weight and grade of the hog just weighed and graded automatically.

The weight ranges assigned to each of sorting pens 15 can be varied as required. The following is an example of how the individual hogs may be sorted.

TABLE I

| | | |
|---|---|---|
| PEN (1) | 200# and down Grade 1, 2 and 3 and 4 | |
| | Assumed Daily Volume | 500 Hogs |
| PEN (2) | 201# to 220# Grade 1 and 2 | |
| | Assumed Daily Volume | 1200 Hogs |
| PEN (3) | 201# to 220# Grade 3 and 4 | |
| | Assumed Daily Volume | 300 Hogs |
| PEN (4) | 221# to 250# Grade 1 and 2 | |
| | Assumed Daily Volume | 1000 Hogs |
| PEN (5) | 221# to 250# Grade 3 and 4 | |
| | Assumed Daily Volume | 500 Hogs |
| PEN (6) | 251# & Up Grade 1, 2 and 3, 4 | |
| | Assumed Daily Volume | 500 Hogs |
| | | 4000 Hogs |

The quantities indicated above are typical of an average day. With individual weighing and grading and the above-indicated sorting, it is no longer necessary to kill hog purchases in loads as purchased, since the weight and grade sort is absolute. Since each hog has its own tattoo or identification number, all subsequent data, dressing yield, cooler shrink, ham circumference, body length, etc. will be associated with this number. The computer will enable reassembly of each of the lots or loads for any evaluation desired pertaining to the lot in question. With practices employed prior to the present invention, it is important to kill all hogs by purchase lots to evaluate dressing yields of each lot.

It has been found that the quality of the slaughtering operation is improved if hogs of similar weight and grade are grouped as slaughtered.

The chilling of hogs as slaughtered by techniques employed prior to the present invention with a complete scramble of all weights and grades being retained in groupings as purchased creates an impossible situation for perfect chilling. Each rail must be loaded for chilling with a fixed number of hogs per rail or rail space may not exist for the last hog slaughtered. The result is extremely heavy hogs on the same rail with very light hogs, followed by medium hogs. If all heavy hogs are on a rail, they will be too close. If all light-weight hogs are on a rail with the same fixed number, it will be under utilization of cooler space.

The result is a matter of record. Heavy hogs are not properly chilled resulting in complaints from customers of excess weepage of moisture from pork loins with shelf life less than competition. Hanging along side of the heavy hogs and scattered throughout the cooler will be light hogs, which have been chilled so hard that it is difficult to pull loins without major defects. Carcass chilling shrink will be reduced if all hogs in a cooler are of uniform size.

The primal yields or finished cuts will improve if the hog cutting butchers are working on hogs of correct uniform temperature of 38° to 40°. Yields also improve if weight and grades are uniform for a long continuous run instead of cutting lights, heavies, medium, grades 1-4-2-3, all scrambled together. Considerable judgement is exercised by the butcher to determine how deep to cut to remove fat. If hogs are uniform, this judgement becomes more accurate.

Some packers do forego the audit of hog purchasing and sort hogs into weights and grades alive and slaughter in uniform groups as they consider the economic gain in production to be greater than the advantage gained from auditing the hog buying. Utilizing the procedures outlined hereinabove, it is possible to capture full advantage of both the auditing and sorting techniques.

With very simple planning, it is feasible to fill each cooler with a separate weight range of hogs. When two quality grade groupings are put in one cooler, it is practical to load one wall with one grade and start at the opposite wall to load the other grade group.

Figure 3:
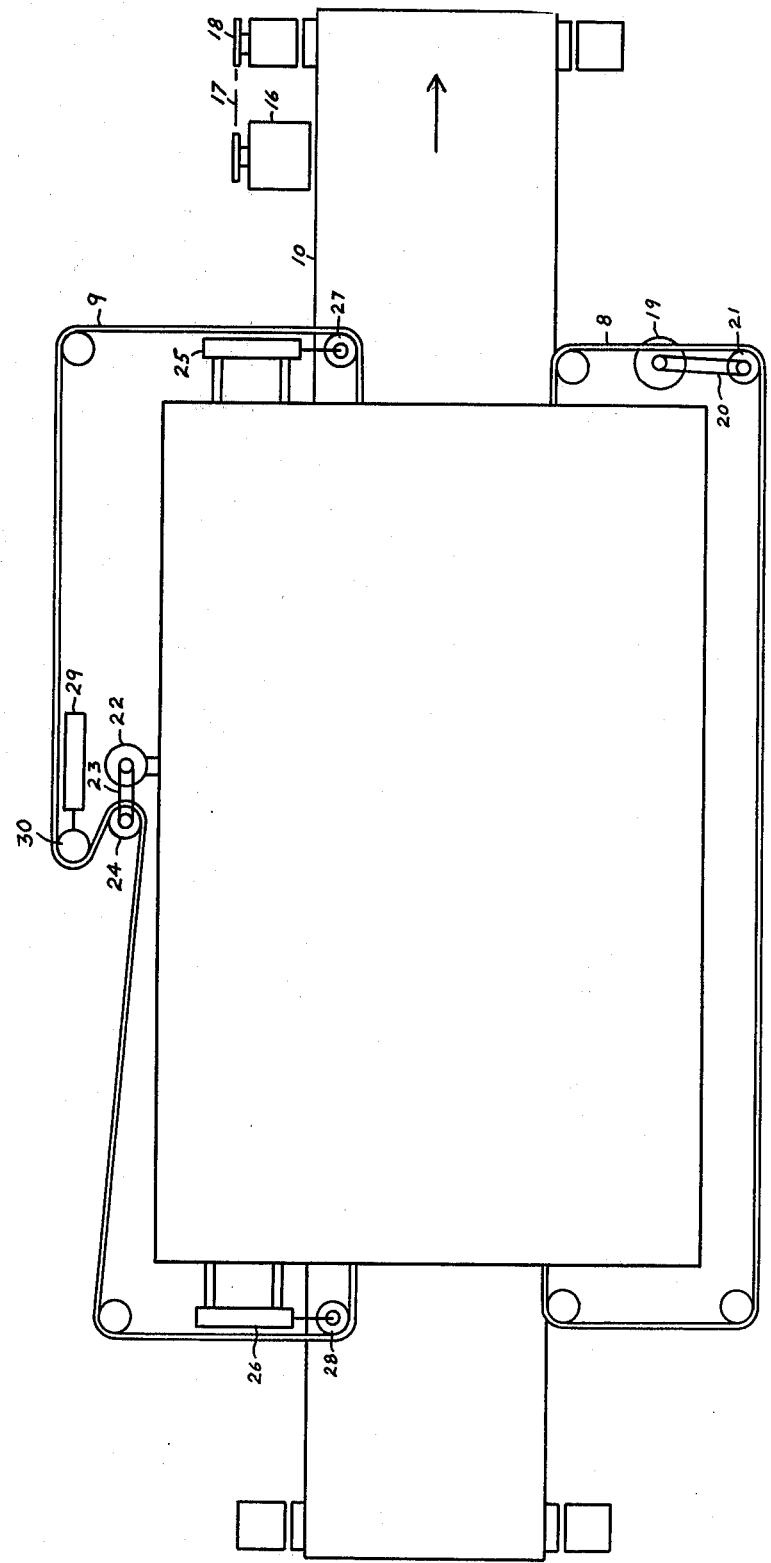
FIG. 3 is a top view of the combined scale and automatic electronic grader employed in the embodiments of FIGS. 1 and 2.
Figure 4:
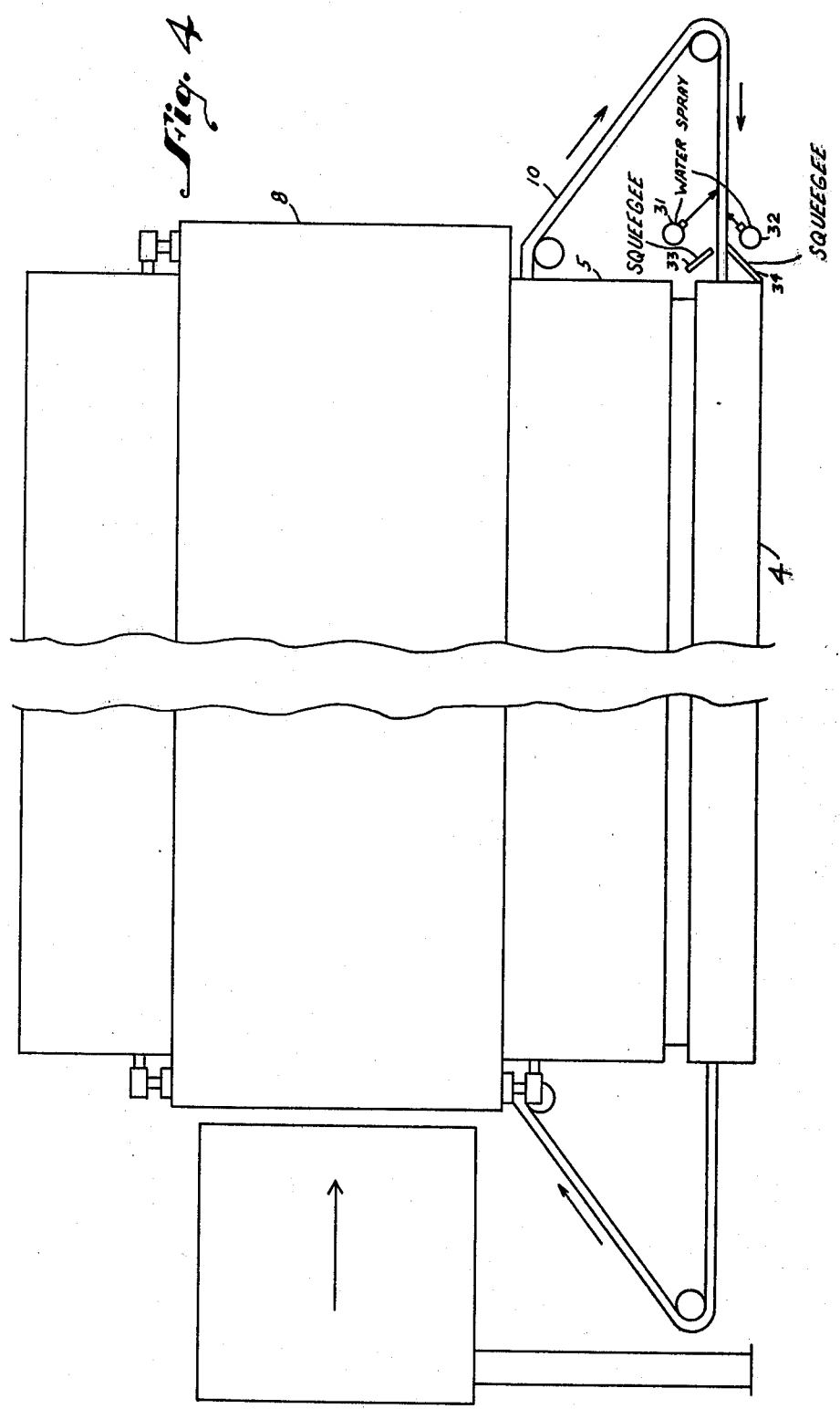
FIG. 4 is a side view of FIG. 3.
Figure 5:
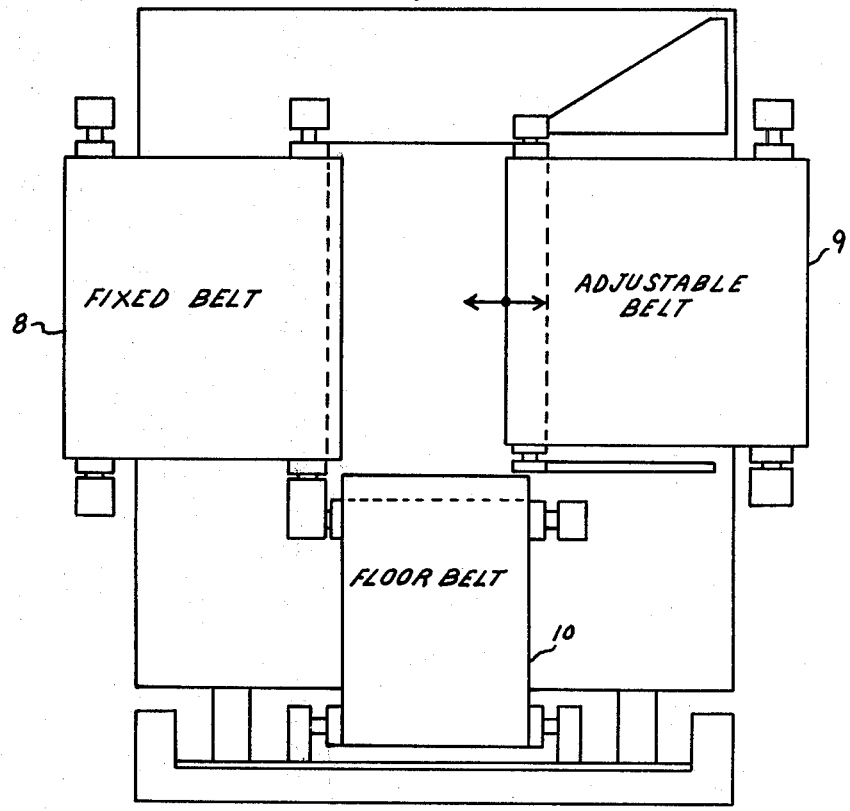
FIG. 5 is a righthand end view of FIG. 3.
Figure 6:
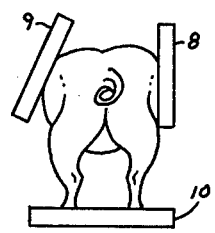
FIG. 6 is a schematic illustration of the relationship between a head of livestock and the conveying belts of the equipment of FIGS. 3, 4 and 5.

Referring to FIGS. 3, 4 and 5, there is disclosed therein the conveying arrangement associated with the combined scale 4 and grader 5. Floor conveyor 10 is driven by motor 16, belt 17 and drive pulley 18 and has a linear speed of approximately 80 feet per minute. Side conveyors 8 and 9 are made of plastic material, with side conveyor 8 being driven by motor 19, belt 20 and drive pulley 21. Side conveyor 9 is driven by drive motor 22, belt 23 and drive pulley 24. As indicated in FIGS. 5 and 6, side belt 9 is adjustable. This adjustability is provided by air cylinders 25 and 26 which act upon pulleys 27 and 28, respectively, to move side conveyor 9 inward and outward with respect to the center of floor conveyor 10. The purpose of this adjustability is to restrain the hog from jumping up and down which would render the weighing of the hog inaccurate due to the impact of the hoofs of the hog upon floor conveyor 10 and hence scale 4. To enable retaining the proper tension on conveyor 9 when adjusted, a take-up air cylinder 29 is provided to act upon pulley 30. The linear speed of side conveyors 8 and 9 are synchronized with respect to each other and floor conveyor 10. A water spray from sources 31 and 32 (FIG. 4) is directed upon both sides of floor conveyor 10 and squeegeed off by squeegees 33 and 34 to clean floor conveyor 10 to remove any droppings from the hogs to ensure an accurate weight of the hog being weighed.

Figure 7:
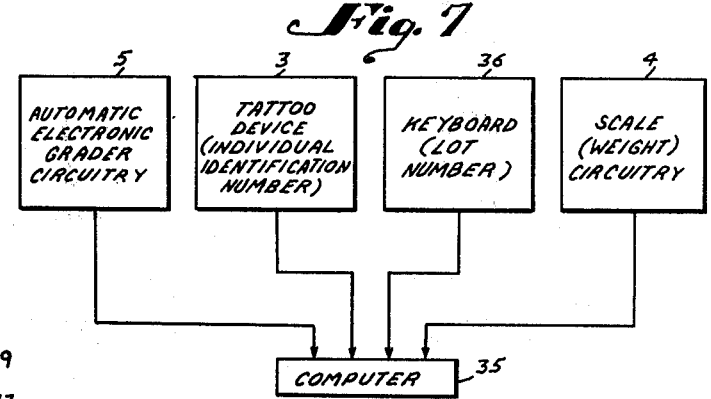
FIG. 7 is a block diagram of the data flow in both embodiments of FIGS. 1 and 2.

FIG. 7 illustrates the data flow in the arrangements of FIGS. 1 and 2. The grade from grader 5 of a particular hog being weighed together with the weight from scale 4 are coupled to a computer 35 along with the identification number applied to that particular hog by tattoo device 3. Computer 35 also receives the lot number from a keyboard 36 so that after sorting according to weight and grade, computer 35 can reassemble the hogs of a particular lot for evaluation. Computer 35 and algorithm for operation thereof is similar in all respects to that disclosed in the above-cited copending application.

Figure 8:
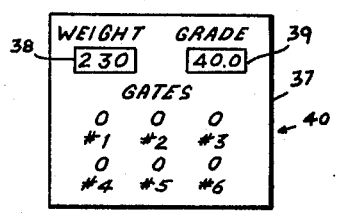
FIG. 8 illustrates a control panel enabling the manual operation of the gates of the gate controlled sorting pens of FIG. 2.

Referring to FIG. 8, there is illustrated therein a control panel 37 coupled electrically to scale 4 and grader 5 including a digital readout 38 to indicate the weight of the hog presently being weighed and a readout device 39 to indicate the grade of that particular hog. An operator mining control panel 37 would read the values present in readout devices 38 and 39 and according to a predetermined plan would activate an appropriate one of the switches 40 to activate a motor associated with an appropriate one of the gates of pens 15 and the selected switch to thereby open that one of the gates of pens 15 to thereby provide manually the desired sorting of the hogs by weight and grade.

FIG. 9 illustrates circuitry to provide an automatic control of the gates of sorting pens 15 to enable sorting of the hogs according to weight and grade. The circuitry associated with scale 4 would include three potentiometers 41, 42 and 43 coupled between a voltage of given magnitude and ground with the sliding contact of each of the potentiometers being fastened to a shaft of the digital wheels of a weight digital readout device so that a voltage is developed, through slip rings associated with each shaft, from each of the potentiometers 41, 42 and 43 which is proportional to the digital value on the wheels of the digital readout device. The voltages removed from potentiometers 41-43 are coupled to an adder 44 to add together the three voltages to provide a sum voltage which is proportional to the weight recorded on the readout device. This sum voltage is converted to a digital representation thereof by the analog-to-digital converter 45 which is then coupled to computer 35 over a transmission line 46. The computer 34 includes therein a digital-to-analog converter 47 to obtain at the output thereof the voltage at the output of adder 44. The voltage output of converter 47 is coupled to a threshold circuit 48 having thresholds established therein to provide four impulse outputs corresponding to the four weight ranges indicated hereinabove in TABLE I assigned to sorting pens 15.

A similar arrangement is provided for the circuitry of grader 5 and includes potentiometers 49-51 associated with a different one of the wheels of the grade digital readout device. The resultant voltages from potentiometers 49-51 are coupled to adder 52 to provide a sum output proportional to the grade which output is converted to a digital form in analog-to-digital converter 53 for transmission over transmission lines 54 to computer 34 which includes therein digital-to-analog converter 55 to provide at the output thereof the voltage proportional to the grade of the hog being graded. This voltage output of converter 55 is coupled to the threshold circuit 56 having established thresholds therein to provide an impulse output for each of the grades 1-4. Logic circuitry 57 including NOT gates and AND gates are coupled to threshold circuits 48 and 56 to provide impulse outputs to control the gates of pens 15 in accordance to the predetermined weights and grades assigned to each of pens 15 in accordance with TABLE I above. It should be noted that the circuitry of FIG. 9 is only an example of circuitry that may be employed to automatically control the gates of pens 5. There are many other forms of circuits that can be designed to accomplish the same end result.

To demonstrate the optimization improvement utilizing the arrangements described hereinabove, there are provided hereinbelow TABLES II and III.

TABLE II

| | | DIRECT PURCHASE INVOICE | | | | |
|---|---|---|---|---|---|---|
| | PURCHASE WEIGHT | COST PER POUND | TOTAL COST | WEIGHT RANGE | GRADE | AVERAGE POUNDS PER HEAD |
| 1 Hog | 147# | × .323 = | $47.48 | 141-150 | 1 | 147 |
| 1 Hog | 159# | × .373 = | 59.30 | 151-160 | 1 | 159 |
| 4 Hogs | 663# | × .423 = | 280.44 | 161-170 | 1 | 165.8 |
| 6 Hogs | 1053# | × .473 = | 498.07 | 171-180 | 1 | 174.6 |
| 4 Hogs | 714# | × .463 = | 330.58 | 171-180 | 2 | 178.5 |
| 9 Hogs | 1687# | × .493 = | 831.69 | 181-190 | 1 | 187.44 |
| 9 Hogs | 1681# | × .483 = | 722.09 | 181-190 | 2 | 186.78 |
| 14 Hogs | 2738# | × .513 = | 1404.59 | 191-200 | 1 | 195.57 |
| 11 Hogs | 2144# | × .503 = | 1078.43 | 191-200 | 2 | 194.91 |
| 7 Hogs | 1442# | × .523 = | 754.17 | 201-210 | 1 | 206.0 |
| 15 Hogs | 3103# | × .513 = | 1591.84 | 201.210 | 2 | 206.87 |
| 1 Hog | 210# | × .503 = | 105.63 | 201.210 | 3 | 210.00 |
| 10 Hogs | 2146# | × .523 = | 1122.36 | 211-220 | 1 | 214.60 |
| 27 Hogs | 5834# | × .513 = | 2992.84 | 211-220 | 2 | 216.07 |
| 5 Hogs | 1078# | × .503 = | 542.23 | 211-220 | 3 | 215.60 |
| 4 Hogs | 894# | × .523 = | 467.56 | 221-230 | 1 | 223.5 |
| 13 Hogs | 2931# | × .513 = | 1502.60 | 221-230 | 2 | 225.46 |
| 1 Hog | 228# | × .503 = | 114.68 | 221-230 | 3 | 228.0 |
| 5 Hogs | 1178# | × .523 = | 616.09 | 231-240 | 1 | 235.6 |
| 12 Hogs | 2820# | × .513 = | 1446.66 | 231-240 | 2 | 235.0 |
| 3 Hogs | 716# | × .503 = | 226.10 | 231-240 | 3 | 238.0 |
| 3 Hogs | 736# | × .513 = | 377.57 | 241-250 | 1 | 245.0 |
| 10 Hogs | 2458# | × .503 = | 1236.37 | 241-250 | 2 | 245.8 |
| 1 Hog | 243# | × .493 = | 119.80 | 241-250 | 3 | 243.0 |
| 2 Hogs | 504# | × .503 = | 253.51 | 251-260 | 1 | 252.0 |
| 5 Hogs | 1280# | × .493 = | 631.04 | 251-260 | 2 | 256.0 |
| 1 Hog | 256# | × .463 = | 118.53 | 251-260 | 4 | 256.0 |
| 5 Hogs | 1326# | × .483 = | 640.46 | 261-270 | 2 | 265.0 |
| 1 Hog | 270# | × .453 = | 122.31 | 261-270 | 4 | 270.0 |
| 3 Hogs | 829# | × .463 = | 383.83 | 271-280 | 3 | 276.3 |
| 1 Hog | 279# | × .443 = | 123.60 | 271-280 | 4 | 279.0 |
| 1 Hog | 288# | × .453 = | 130.46 | 281-290 | 3 | 288.0 |
| 1 Hog | 290# | × .453 = | 131.37 | 281-290 | 2 | 290.0 |
| 1 Hog | 295# | × .423 = | 124.79 | 291-300 | 3 | 295 |
| 1 Hog | 298# | × .443 = | 132.01 | 291-300 | 4 | 298 |
| 2 Hogs | 648# | × .423 = | 274.10 | 300-350 | 3 | 324 |
| 200 | 43566 | | 21536.18 | | | 217.83 |
| | | AVERAGE PRICE PER HEAD = $107.68 | | | | |

TABLE III

| | # | PRICE PER POUND | INVOICE AMOUNT | WEIGHT RANGE | GRADE | AVERAGE WEIGHT PER HOG |
|---|---|---|---|---|---|---|
| 3 Hogs | 468 | $.373 | $174.56 | 151/160# | 1 | 156# |
| 12 Hogs | 2088 | .423 | 883.22 | 171/180 | 1 | 174 |
| 10 Hogs | 1847 | .493 | 910.57 | 181/190 | 1 | 184.7 |
| 24 Hogs | 4602 | .513 | 2360.83 | 191/200 | 1 | 191.75 |
| 39 Hogs | 8656 | .523 | 4527.09 | 201/240 | 1 | 217.14 |
| 96 Hogs | 21381 | .513 | 10968.45 | 201/240 | 2 | 221.99 |
| 6 Hogs | 1596 | .483 | 770.87 | 260/270 | 2 | 266.00 |
| 4 Hogs | 1108 | .463 | 513.00 | 270/280 | 3 | 277.00 |
| 2 Hogs | 578 | .463 | 267.61 | 280/290 | 2 | 289.00 |
| 2 Hogs | 593 | .443 | 262.70 | 290/300 | 3 | 296.50 |
| 2 Hogs | 649 | .423 | 274.53 | 300/350 | 3 | 324.5 |
| 200 | 43566 | | $21913.43 | 109.57-Avg. Cost Per Head | | |

TABLE II is a direct purchase invoice showing the cost of one load of 200 hogs, which is a statistical representation of the weight and grade description of all direct purchased hogs for the week of June 5, 1978 employing the hog purchase price buying chart for that date and the individual weighing and grading system of this invention. TABLE III relates to the same identical load of hogs sorted into eleven weight and grade categories and weighed in eleven separate drafts using the same price buying chart as in TABLE II and employing the subjective judgement of a skilled hog buyer-grader.

Direct purchases from producers account for 40% of all hogs purchased by ITT Gwaltney, Inc. on an annual basis. Savings on these hogs amount to $1.886 per hog employing the techniques of this invention.

Hogs purchased through order buyers, commission buyers and country markets would be audited and evaluated immediately upon arrival to determine deviations between their weight and grade sorts and our resultant weighing and grading as individuals. Trade practices would not make it possible to file a claim for this discrepancy, however, our hog buying office has expressed an opinion that this accurate knowledge and feedback would improve the grade and sort of subsequent loads.

A greater opportunity for savings exists on order buyer purchases since a tendency exists for dealers to average the averages and to intentionally create more hogs in higher price brackets.

Using a $1.886 savings on direct purchase hogs as a conservative basis to calculate cost reduction on order buyer, etc., purchases we have anticipated that we can reduce this added cost by 20% due to an exact audit on each load or a reduction of $0.377 per hog purchased from order buyer, etc. 60% of all hogs purchased annually are purchased from order buyers, etc. 60% of 900,000 hogs, annular volume, or 540,000 hogs at $0.377=$203,588 savings. Furthermore, a more accurate control of individual hog weights will result in more emphasis being placed on buying the desired weight range of hogs to match our primal cutting needs.

The arrangement of this invention would be more effective with indirect order buyers, etc. in a period of abundant marketing of hogs. In a period of short supply of hogs, the order buyers, etc. would be in a position to market hogs to an outlet with less effective controls enabling him to improve upon his realization by less than an accurate sort.

Comparing TABLE II which shows for a total of 200 hogs a total weight of 43,556 pounds at a cost of $21,536.18, with TABLE III which shows for a total of 200 hogs a total weight of 43,566 pounds at an amount of $21,913.43 results a reduction in cost

---

$\frac{\$377.25}{200 \text{ head}}$ = $1.886 per hog

| | |
|---|---|
| 900,000 hogs projected annual volume × 40% direct buy | = 360,000 hogs |
| 360,000 hogs direct buy × $1.886 per hog savings on direct purchases | = $678,960.00 |
| Savings on hogs purchased from country markets, order buyers, commission buyers, etc. | |
| 540,000 hogs × $.377 per hog Anticipated annual reduction in hog cost due to individual weight and grade | = $203,580.00 |
| | = $882,540.00 |
| Since effective control will vary with availability of hogs, these savings have been reduced to 50% of $882,540.00 | = $441,270.00 |

---

This would reflect the worst situation resulting from an extreme shortage of hogs.

It is to be noted that the discounts from top weight and grade are fixed and rarely vary even though top hogs may advance or decline by more than 100%.

Hence, market price fluctuations have been disregarded in these calculations.

Every packer has hogs which die in pens from stress and overheating. This loss amounted to $73,000.00 at ITT Gwaltney, Inc. in 1977. The conveyors 6, 7, 8, 9, 10 and 14 employed in the arrangement of the present invention will reduce the exercising of the hogs and therefore, the number of hogs dying from heat and exhaustion will be substantially reduced which will result in a further decrease in overhead costs.

While I have described above the principles of my invention in connection with specific apparatus it is to be clearly understood that this description is made only by way of example and not as a limitation to the scope of my invention as set forth in the objects thereof and in the accompanying claims.

I claim:

1. An arrangement to improve the optimization of the value of finished cuts obtained from each of a plurality of heads of livestock in a livestock processing plant comprising:

first means to apply a different identification mark to each of said plurality of heads of livestock and to couple each of said marks to an optimization computer, each of said marks remaining with its associated one of said plurality of heads of livestock until said finished cuts are obtained;

second means disposed adjacent said first means to separately weigh each of said heads of livestock in sequence and to couple each of the resultant weights to said computer, each of said weights being correlated with an associated one of said marks; and third means disposed adjacent said second means to separately and automatically grade each of said heads of livestock in sequence and to couple each of the resultant grades to said computer, each of said grades being correlated with an associated one of said marks and an associated one of said weights.

2. An arrangement according to claim 1, wherein said third means is supported on said second means to enable obtaining said weight and said grade of each of said plurality of heads of livestock substantially simultaneously.

3. An arrangement according to claim 2, wherein said second and third means are disposed above ground, and entrance and exit inclined ramps are provided for said second and third means to enable each of said plurality of heads of livestock to enter and exit said second and third means.

4. An arrangement according to claim 3, wherein each of said weights and each of said grades are obtained when each of said plurality of heads of livestock walk on and through said second and third means, respectively.

5. An arrangement according to claim 2, wherein said third means includes conveyor means to convey each of said plurality of heads of livestock through said third means and across said second means.

6. An arrangement according to claim 5, wherein said conveyor means includes floor conveyor moving at a predetermined rate, and two side conveyors moving at said given rate to restrain each of said plurality of heads of livestock from walking.

7. An arrangement according to claim 6, wherein said floor and side conveyors are stopped periodically for a predetermined length of time to enable obtaining a static weight for each of said plurality of heads of livestock.

8. An arrangement according to claim 7, wherein said second and third means are disposed above ground, and
said conveyor means further includes
entrance and exit inclined conveyors to enable each of said plurality of heads of livestock to enter and exit said second and third means.

9. An arrangement according to claim 7, wherein at least one of said side conveyors are tiltable to restrain each of said plurality of heads of livestock from jumping up and down.

10. An arrangement according to claim 1, further including
an indexing restrainer disposed prior to said second and third means to ensure that each of said plurality of heads of livestock are processed by said second and third means separately and in sequence.

11. An arrangement according to claim 10, wherein said first means is operated while each of said plurality of heads of livestock is disposed in said indexing restrainer.

12. An arrangement according to claim 1, wherein each of said weights is obtained when each of said plurality of heads of livestock passes over said second means, and
each of said grades is obtained when each of said plurality of heads of livestock passes through said third means.

13. An arrangement according to claim 1, further including
fourth means disposed adjacent said third means to sort said plurality of heads of livestock according to said weights and said grades.

14. An arrangement according to claim 13, wherein said fourth means includes
a plurality of gate controlled pens disposed adjacent a passageway for said plurality of heads of livestock leading from said third means, each of said pens being assigned a predetermined range of weights and at least one grade, and
fifth means coupled to said second and third means and said plurality of gates to enable opening one of said plurality of gates at a time dependent on the weight and grade of each of said plurality of heads of livestock just weighed and graded.

15. An arrangement according to claim 14, wherein said fifth means includes
a digital readout for each of said second and third means, and
sixth means to enable manually opening an appropriate one of said plurality of gates according to the weight and grade present on an associated one of said readouts to accomplish the desired sorting.

16. An arrangement according to claim 14, wherein said fifth means includes
a digital readout for each of said second and third means, and
sixth means responsive to the weight and grade present on an associated one of said readouts to automatically open an appropriate one of said plurality of gates to accomplish the desired sorting.

17. An arrangement according to claim 14, further including
a conveyor disposed in said passageway to carry said plurality of heads of livestock sequentially to said plurality of pens.

18. An arrangement according to claim 13, wherein said third means is supported on said second means to enable obtaining said weight and said grade of each of said plurality of heads of livestock substantially simultaneously.

19. An arrangement according to claim 18, wherein said second and third means are disposed above ground, and
entrance and exit inclined ramps are provided for said second and third means to enable each of said plurality of heads of livestock to enter and exit said second and third means.

20. An arrangement according to claim 19, wherein each of said weights and each of said grades are obtained when each of said plurality of heads of livestock walk on and through said second and third means, respectively.

21. An arrangement according to claim 18, wherein said third means includes
conveyor means to convey each of said plurality of heads of livestock through said third means and across said second means.

22. An arrangement according to claim 21, wherein said conveyor means includes
floor conveyor moving at a predetermined rate, and
two side conveyors moving at said given rate to restrain each of said plurality of heads of livestock from walking.

23. An arrangement according to claim 22, wherein said floor and side conveyors are stopped periodically for a predetermined length of time to enable obtaining a static weight for each of said plurality of heads of livestock.

24. An arrangement according to claim 23, wherein said second and third means are disposed above ground, and
said conveyor means further includes
entrance and exit inclined conveyors to enable each of said plurality of heads of livestock to enter and exit said second and third means.

25. An arrangement according to claim 23, wherein at least one of said side conveyors are tiltable to restrain each of said plurality of heads of livestock from jumping up and down.

26. An arrangement according to claim 13, further including
an indexing restrainer disposed prior to said second and third means to ensure that each of said plurality of heads of livestock are processed by said second and third means separately and in sequence.

27. An arrangement according to claim 26, wherein said first means is operated while each of said plurality of heads of livestock is disposed in said indexing restrainer.

28. An arrangement according to claim 13, wherein each of said weights is obtained when each of said plurality of heads of livestock passes over said second means, and
each of said grades is obtained when each of said plurality of heads of livestock passes through said third means.

* * * * *